United States Patent
Barber et al.

(10) Patent No.: US 6,512,527 B1
(45) Date of Patent: Jan. 28, 2003

(54) METHOD AND APPARATUS FOR INTERACTIVELY SELECTING DISPLAY PARAMETERS FOR AN AVIONICES FLIGHT DISPLAY

(75) Inventors: Sarah Barber, Robins, IA (US); Norm W. Arons, Cedar Rapids, IA (US); George W. Palmer, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 09/392,366

(22) Filed: Sep. 8, 1999

(51) Int. Cl.[7] .................................................. G09G 5/00
(52) U.S. Cl. ........................ 345/764; 345/829; 340/945
(58) Field of Search ................................ 345/845, 829, 345/840, 859, 810, 764; 340/945, 971, 973; 244/175

(56) References Cited

U.S. PATENT DOCUMENTS

| | | | |
|---|---|---|---|
| 5,340,061 A | * 8/1994 | Vaquier et al. | 244/175 |
| 5,416,705 A | * 5/1995 | Barnett | 701/14 |
| 5,844,503 A | * 12/1998 | Riley et al. | 340/945 |
| 6,064,922 A | * 5/2000 | Lee | 701/3 |
| 6,150,959 A | * 11/2000 | Germanetti | 340/971 |
| 6,246,341 B1 | * 6/2001 | Germanetti | 340/946 |

OTHER PUBLICATIONS

Co–pending application, Docket No. 99CR107/KE, entitled "Method and Apparatus For Interactively Selecting, Controlling and Displaying Parameters For An Avionics Radio Tuning Unit" by George W. Palmer, Claude Eyssautier, and Matt Smith;*

Co–pending application, Docket No. 99CR108/KE, entitled "Method and Apparatus For Interactively Displaying A Route Window For A Flight Management System" by Gary L. Owen, Sarah Barber, and George W. Palmer;.*

Co–pending application, Docket No. 99CR109/KE, entitled "Method and Apparatus For Graphically Inserting Waypoints For A Flight Management System" by Martin Pauly; and.*

Co–pending application, Docket No. 99CR113/KE, entitled "Method And Apparatus For Interactively And Automatically Selecting, Controlling And Displaying Parameters For An Avionics Electronic Flight Display System" By Matt Smith and Gary L. Owen.*

* cited by examiner

*Primary Examiner*—Raymond J. Bayerl
*Assistant Examiner*—Tadesse Hailu
(74) *Attorney, Agent, or Firm*—Nathan O. Jensen; Kyle Eppele

(57) ABSTRACT

An apparatus and method for displaying Flight Management System (FMS) and other information whereby menu options are selected by merely clicking a mouse, cursor or other type of button and advancing through the available menu options in a cyclical manner, such that no cursor movement is required to select among the various menu options.

7 Claims, 6 Drawing Sheets

FLIGHT SUMMARY

HIHAL                    N41° 57.39 W089° 52.48
ETA       12:21            ATA        12:27+ 5
DIST       3NM
FUEL      8950            ACT FUEL   8460- 490
WIND      090T/ 5KT       SAT            -22° C
ALT       FL190           MID PT    N4157W089
MID WIND  090T/ 5KT       MID SAT        -22° C

PLL                      N41° 57.94 W089° 31.45
ETA       12:27+ 5         LEG T       0:02
DIST       13NM            CRS         088°
FUEL      8320- 530

SENSORS

VOR/DME

| | IDENT | FREQ | BRG/DIS |
|---|---|---|---|
| GPS | CID | 114.10 | 191.0° |
| IRS | CID | 114.10H | 21.5 NM |
| VOR/DME | ALO | 112.20 | 63.3 NM |
| DME 1-2 | LNR | 112.80 | 126.4 NM |
| DME 1-3 | | | |
| VOR 2 | IOW | 116.20 | 337.4° |
| DME 2-1 | IUUS | 110.15 | 5.1 NM |
| DME 2-2 | DSM | 117.50 | 77.9 NM |
| DME 2-3 | ---- | | --.- NM |

N1 %      23.9    23.9
ITT°C     298     298
N2 %      37.3    37.3
FF PPH    120     120

TEMP +15 °C    CG  A  F         STAB  ND    5.3
                                      NU
FUEL LB QTY  4500   190   950

INITIALIZATION STATUS

DATE▶ 02FEB99    UTC▶ 15:06Z    LOCAL▶ 18:06

NAV DATA BASE    WORLD

[09JAN99]  [05FEB99]  [06FEB99]  [08MAR99]

MODEL  COLLINS        VARIANT  MRFD
MTOW   11000LB        ENGINE   GE2
PER DATA BASE  123-4567-890
PER DATA BASE  123-4567-890

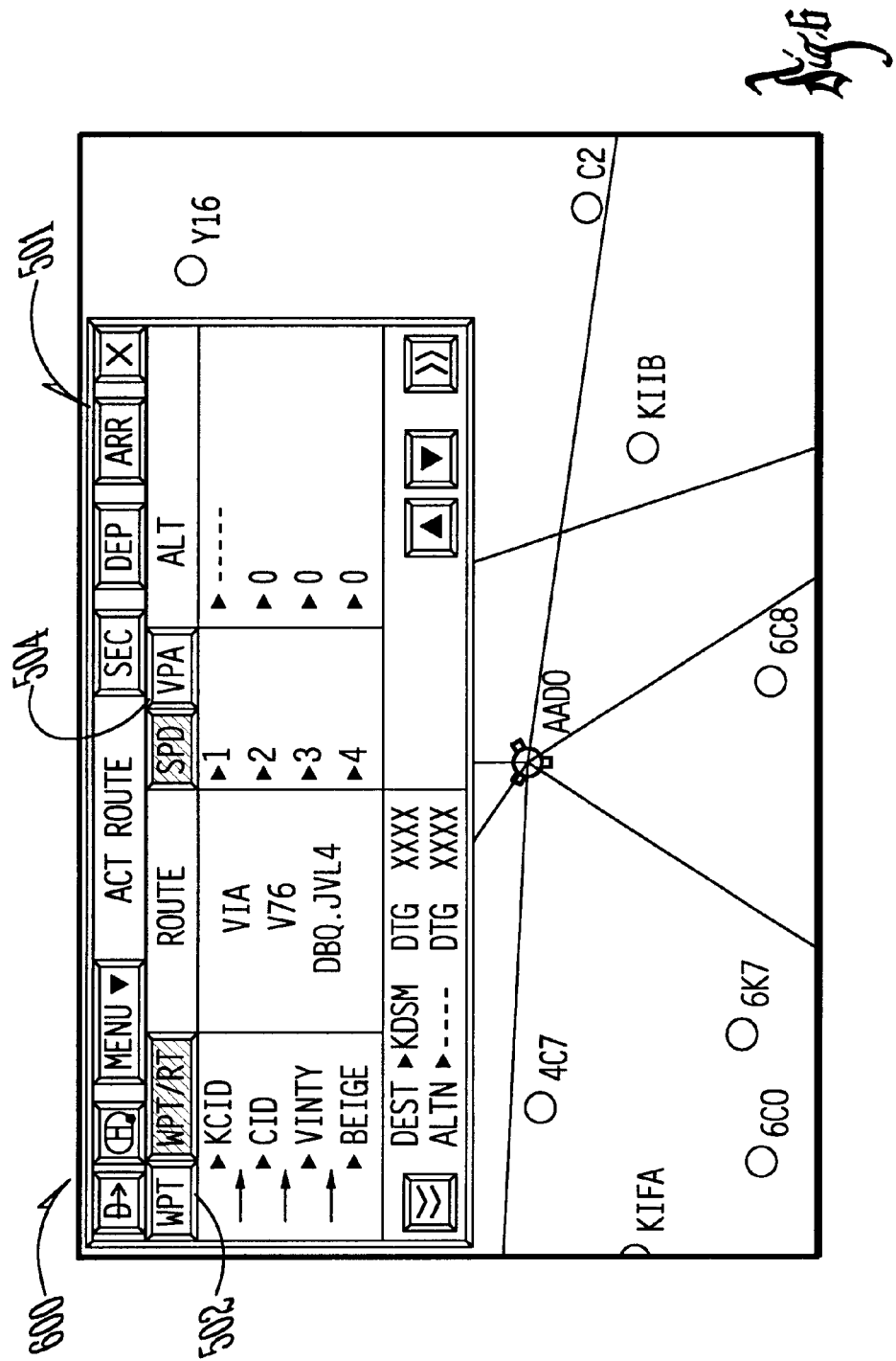

METHOD AND APPARATUS FOR INTERACTIVELY SELECTING DISPLAY PARAMETERS FOR AN AVIONICES FLIGHT DISPLAY

CROSS REFERENCE TO RELATED PATENT APPLICATIONS

This application is related to the below listed co-pending patent applications which are filed on even date herewith, are assigned to the same assignee, and are incorporated herein in their entirety by these references:

U.S. Ser. No. 09/391,781 entitled "Method and Apparatus For Interactively Selecting, Controlling And Displaying Parameters For An Avionics Radio Tuning Unit" by George W. Palmer, Claude Eyssautier, and Matt Smith;

FIELD OF THE INVENTION

The present invention generally relates to avionics, and more particularly relates to avionics systems, including, but not limited to, flight management systems (FMSs), and even more particularly relates to avionics flight displays, including, but not limited to, FMS displays with multiple pages of information.

BACKGROUND OF THE INVENTION

In the past, designers of avionics displays and flight computer systems have endeavored to achieve a reduction in pilot workload. One area of concern has been the FMS, which typically requires a significant amount of "heads-down" time. This "heads-down" time occurs when the pilot is neither looking at the primary flight displays, nor out the wind screen, but instead is focused upon a task in an oblique direction, such as when using a typical FMS control display unit (CDU), which has an integrated keyboard and a textual display unit. One approach has been proposed in which a large multi-functional display, disposed in front of the pilot, is used for both viewing FMS information, as well as data input through a cursor. In some prior art applications, especially those having a need for displaying large amounts of information, a cursor is used to select and open a menu of buttons or links from which to choose and click for additional textual pages. When the menu is clicked to open, the pilot is then required to move the cursor again to select among the several options presented in the newly opened menu window. While these menus of buttons or optional links have clear advantages, they also have significant drawbacks.

During times of moderate and severe turbulence, otherwise very simple tasks can become difficult and time consuming. For example, the step of requiring a pilot to reposition the cursor to select from several options in a newly opened menu window may require considerable time during times of severe turbulence. Additionally, during take-off and approach, the workload on a pilot can already be extreme, leaving the pilot with little or no time to spare. This additional effort, at an already busy time, is quite undesirable.

Consequently, there exists a need for improved methods and apparatuses for effecting the selection of menu window options for avionics displays.

SUMMARY OF THE INVENTION

It is an object of the present invention to provide an improved avionics display graphical user interface.

It is a feature of the present invention to include a menu which opens a group of buttons which are selectable via a cyclical series of clicks without requiring additional cursor movement.

It is another feature of the present invention to include a tool bar or multifunction button having a group of buttons or fields thereon which are selectable by a cyclical series of clicks without a need to move the cursor over such buttons or fields.

It is an advantage of the present invention to reduce pilot workload.

The present invention is an apparatus and method for selecting among a group of buttons on a display, which is designed to satisfy the aforementioned needs, provide the previously stated objects, include the above-listed features, and achieve the already articulated advantages. The present invention is carried out in a "cursor motion-less" manner in a sense that the undesirable requirement to move a cursor to select among a group of buttons has been greatly reduced.

Accordingly, the present invention is an avionics display having a graphical user interface with a region therein where each of a group of buttons located therein can be selected by merely clicking, without the need to move the cursor over each of the buttons in the group.

BRIEF DESCRIPTION OF THE DRAWINGS

The invention may be more fully understood by reading the following description of the preferred embodiments of the invention, in conjunction with the appended drawing wherein:

FIG. 1 is a representation of an avionics display of the present invention, showing the display partitioned into quadrants, and where the shaded regions represent portions of the display which are highlighted.

FIG. 4 is a representation of an avionics display of the present invention, showing the display partitioned into quadrants, wherein the box in the lower right hand corner relates to VOR/DME, and where the shaded region of the menu, labeled VOR/DME, represents a portion of the display which is highlighted.

FIG. 6 is a representation of a display of the present invention wherein the box in the upper left portion is a route window having multi-segmented buttons, where the shaded regions of the buttons, labeled WPT/RT and SPD, represent portions of the display which are highlighted.

DETAILED DESCRIPTION

Figure 1:
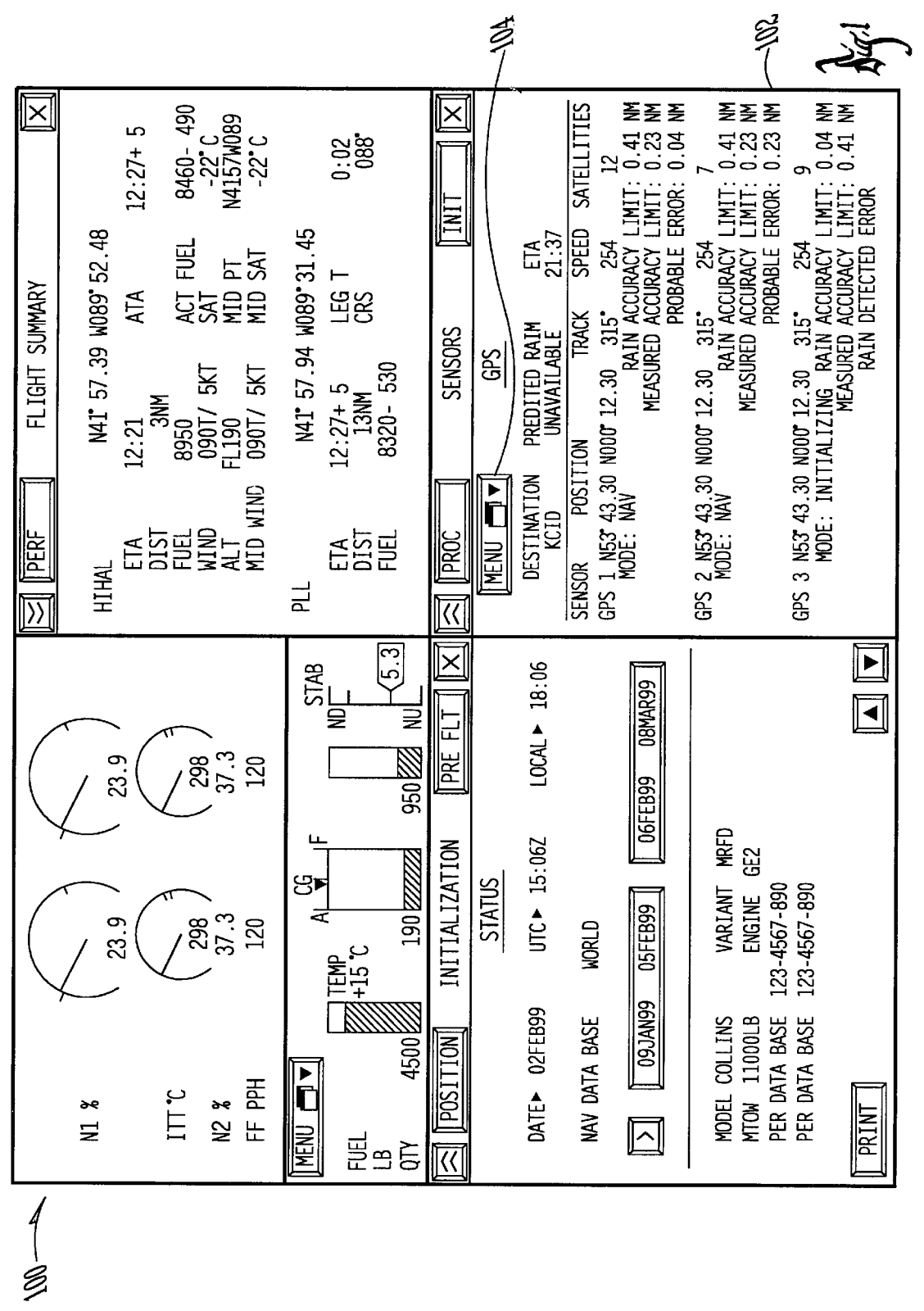
Figure 2:
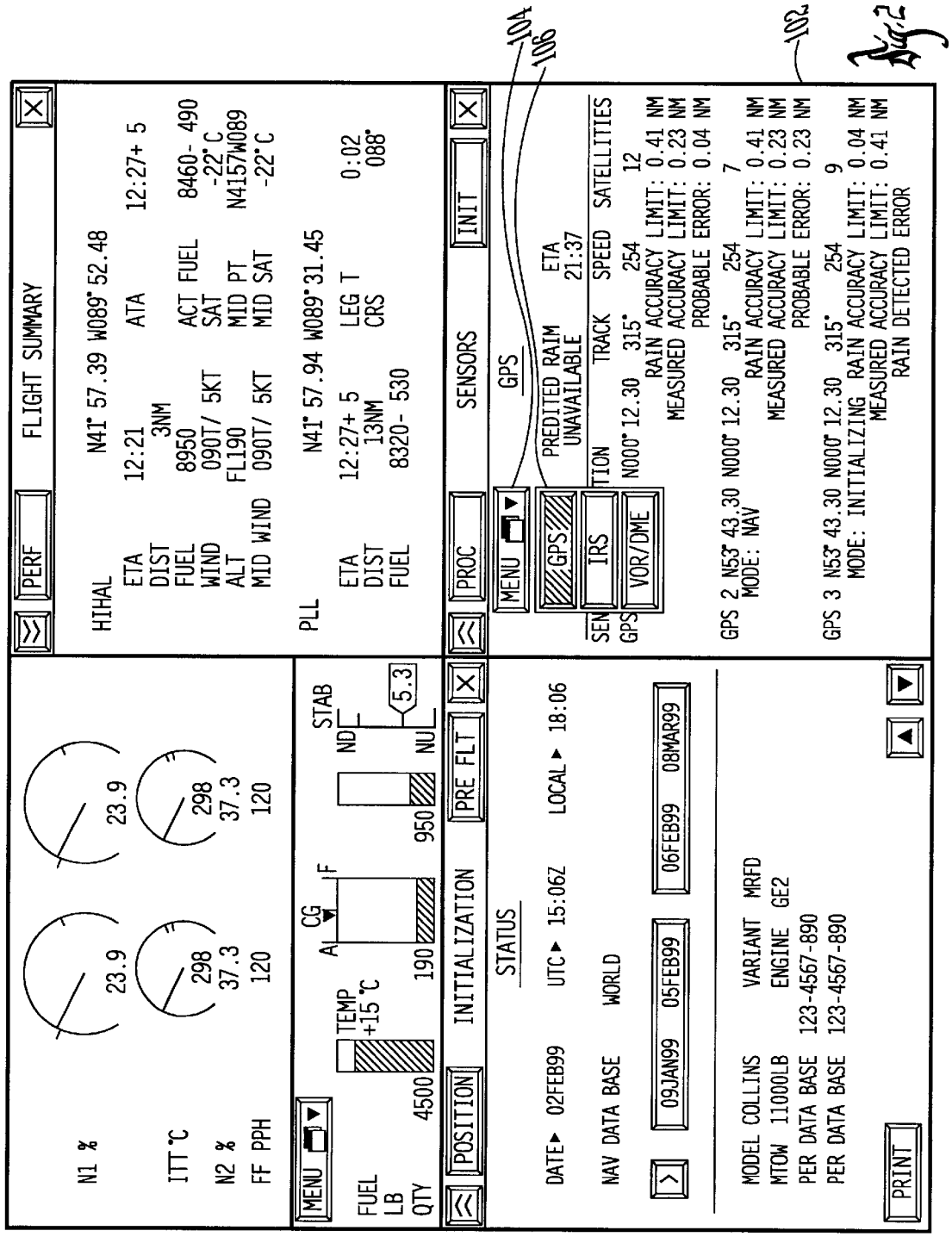
FIG. 2 is a representation of an avionics display of the present invention, showing the display partitioned into quadrants, wherein the box in the lower right-hand corner relates to GPS, and where the shaded region of the menu, labeled GPS, represents a portion of the display which is highlighted.

Now referring to the drawings wherein like numerals refer to like matter throughout, there is shown in FIG. 1, a display of the present invention, generally designated 100 having a lower right-hand section 102 which is a textual FMS display of sensor information. Due to the amount of sensor information to be displayed, and due to space limitations, the data available for display with respect to sensors is divided into several pages. A drop-down menu 104 is shown in the upper left hand corner of lower right-hand section 102. This drop-down menu 104 can be used to conveniently access these several pages.

Now referring to FIG. 2, there is shown a display of the present invention, generally designated 200, which also shows a group of available menu options 106. This FIG. 2 is the result of selecting the drop-down menu 104, which can be done by moving the cursor over drop down menu 104 or clicking on drop down menu 104. These optional details of the graphical user interface are well known in the art and are a matter of designer's choice, or if desired, they can be a pilot or airline selectable option. Upon the selection of drop-down menu 104, the group of available menu options 106 automatically appears and thereby displays the additional buttons in the group of available menu options 106. The further selection of the additional buttons with the group of available menu options 106 can be accomplished in two ways. First of all, a prior art method of moving the cursor over the desired button and then clicking will result in a selection. Alternatively, an innovative approach, which achieves the above listed objectives and advantages, can be employed. This innovative approach does not require the pilot to move the cursor over the desired button in the group of available menu options 106; instead, a mere series of clicks will advance a selection highlight mark (shown herein as a shaded region) over the buttons. The lower right-hand section 102 is automatically changed with each new click to show the information associated with each newly selected button. The selection highlight mark will cycle through the buttons, in the group of available menu options 106; then automatically return to a first button, in the group of available menu options 106, when an additional click occurs after the last of the buttons has been selected. The pilot may simply click through the group of available menu options 106 without any need to move the cursor. During times of extreme turbulence, this can be extremely beneficial. In this FIG. 2, the group of available menu options 106 shows that the button selected (shaded) is the GPS button, and the data presented in lower right-hand section 102 is GPS related data. While it may be preferred to require only a single click to advance a selection to the next available menu option, it is conceivable that alternate schemes of clicking could be employed. For example, each menu option could be uniquely assigned to a unique group of clicks, i.e. a "signature of clicks." This could be as simple as one click for a first menu option and rapid double click for a second menu option and a rapid triple click for a third menu option, etc. Various other schemes could be employed as well. The scheme described herein is merely an example of the preferred scheme known to the inventors at this time.

Figure 3:
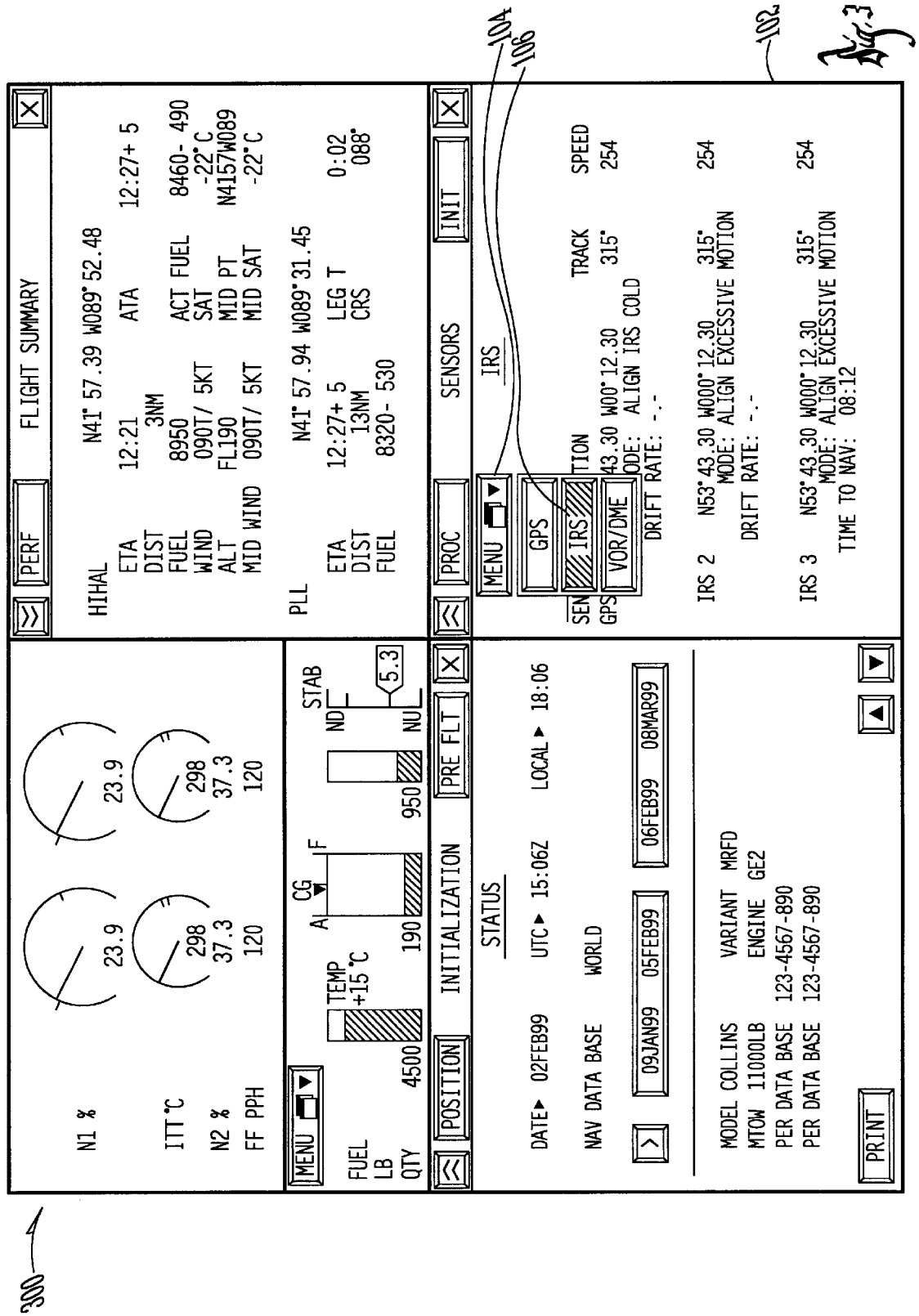
FIG. 3 is a representation of an avionics display of the present invention, showing the display partitioned into quadrants, wherein the box in the lower right-hand corner relates to IRS, and where the shaded region of the menu, labeled IRS, represents a portion of the display which is highlighted.

Now referring to FIG. 3, there is shown a display, generally designated 300, of the present invention. This display is the result of a single click occurring during the display of FIG. 2. In this FIG. 3, the group of available menu options 106 shows that the button selected (shaded) is the IRS button, and the data presented in lower right-hand section 102 is IRS related data.

Now referring to FIG. 4, there is shown a display, generally designated 400, of the present invention. This display is the result of a single click occurring during the display of FIG. 3. In this FIG. 4, the group of available menu options 106 shows that the button selected (shaded) is the VOR/DME button, and the data presented in lower right hand section 102 is VOR/DME related data. If another single click were to occur, the display would cycle back to that shown in FIG. 2.

Figure 5:
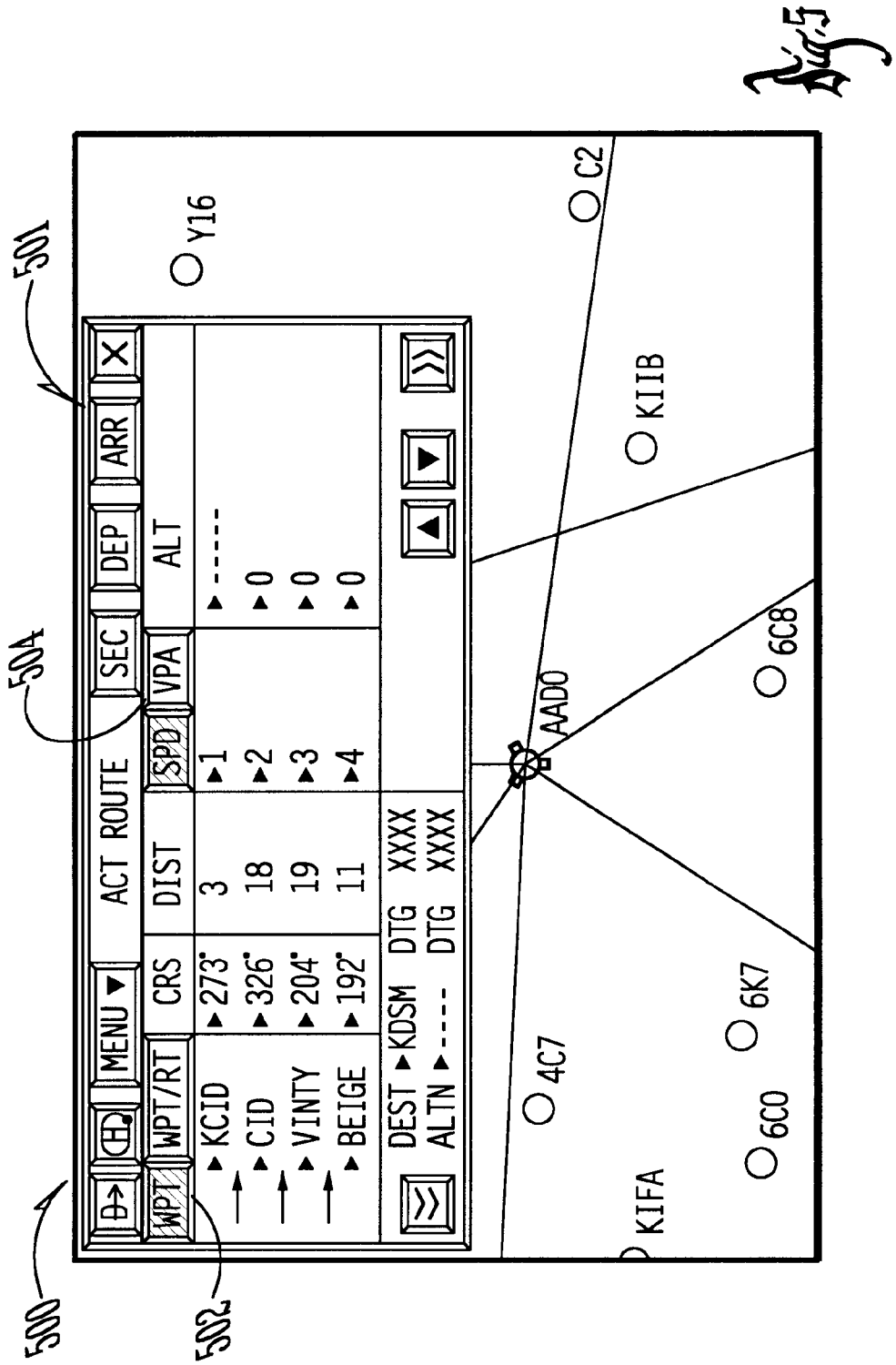
FIG. 5 is a representation of a display of the present invention wherein the box in the upper left portion is a route window having multi-segmented buttons, where the shaded regions of the buttons, labeled WPT and SPD, represent portions of the display which are highlighted.

Now referring to FIG. 5, there is shown a display of the present invention, generally designated 500, which shows an alternate embodiment of the present invention. Shown is a route window 501 having a first selection button 502 and second selection button 504. First selection button 502 and second selection button 504 are buttons in which each button has a plurality of functions or mode labels thereon which identify independent possible selections. First selection button 502 and second selection button 504 each only show two possible selections thereon; however, it should be understood that more selections per button are possible. In this FIG. 5, first selection button 502 shows the WPT function as being highlighted, and in second selection button 504, the SPD function is highlighted. The material displayed beneath first selection button 502 relates to the WPT function.

Now referring to FIG. 6, there is shown a display of the present invention, generally designated 600, which shows the result of a single additional click after first selection button 502 had been selected and displayed, as in FIG. 5. In this FIG. 6, first selection button 502 now shows the WPT/RT function as being highlighted. The material displayed beneath first selection button 502 relates to the WPT/RT function. A single additional click will result in a cycling of the selection back to the WPT function as is shown in FIG. 5.

Throughout this description, the terms "buttons" and "clicking" have been used. They are selected because they are believed to readily convey the present invention; however, it should be understood that other visual marks other than buttons could be substituted, and actions other than clicking could be substituted as well. It is intended that the present invention and the claims below be read to include all variations of these concepts. The parameters shown in first selection button 502 and second selection button 504 are merely exemplary of many other parameters and abbreviations for such parameters which could be used with the present invention.

Throughout this description, the present invention has been frequently characterized as an FMS display. It is believed that an FMS display may be the type of avionics display that most clearly benefits from the innovative concepts of the present invention; however, other avionics displays are also capable of enjoying the benefits of the present invention as well. The use of FMS in this description is merely exemplary. An FMS is chosen because the advantages and benefits of the present invention are very easily understood and placed into perspective when they are viewed in conjunction with an FMS display. Consequently, this description should not be read to be limited to FMS displays only, but it is intended to be used in all other avionics displays as well. A person having ordinary skill in the art would readily understand the many other possible uses in avionics displays, and, therefore, it is not necessary to list them here.

The hardware and software to create the displays of the present invention are either well known in the art or could be adapted, without undue experimentation, from well-known hardware and software, by persons having ordinary skill in the art, once they have carefully reviewed the description of the present invention included herein.

It is thought that the method and apparatus of the present invention will be understood from the foregoing description and that it will be apparent that various changes may be made in the form, construct steps and arrangement of the parts and steps thereof, without departing from the spirit and scope of the invention or sacrificing all of their material advantages. The form herein described is merely a preferred exemplary embodiment thereof.

We claim:

1. An avionics display, having a predetermined size characteristic, and said display of the type which has more information available for displaying thereon than can be reasonably accommodated by said size characteristic at a single instant in time; the display comprising:

a cursor controller for controlling a cursor movement of a cursor on the avionics display;

a menu, said menu having a group of available menu options that are selected to be displayed in a repeating predetermined order in response to a generation of selection signals;

wherein said selection signals are the result of one or more identically actuated clickings of a button which is readily manipulated by a pilot's same hand which manipulates the cursor controller; and wherein said clicking of the button is accomplished without the pilot being required to discontinue physical contact with the cursor controller or to manipulate the controller; and wherein said selection signals are a series of unique groups of selection signals, where each group of selection signals comprises a number of clicks of the button, and where the number of clicks of the button corresponding to each group of selection signals is different than the number of clicks of the button corresponding to other groups of selection signals, wherein each group of selection signals is uniquely associated with one of said menu options.

2. An avionics display of claim 1 wherein said selection signals have a cyclical characteristic where a single additional occurrence of generation of selection signals results in a selection of one of said menu options in the repeating predetermined order.

3. An avionics display of claim 1 wherein a display of information corresponding to a selection automatically occurs upon each new selection.

4. An avionics display of claim 1 wherein said menu is a drop-down menu.

5. An avionics display of claim 1 wherein said menu is a multi-function button having multiple labels thereon.

6. An avionics display of claim 1 wherein said selection results in a visual highlighting of a portion of said display corresponding to one of said menu options.

7. A display comprising:

means for displaying textual information;

cursor control means for controlling a cursor displayed on the means for displaying, said cursor control means being manipulated by a hand of a pilot;

a graphical user interface means for grouping textual information into a plurality of menu options; and, means for selecting each menu option among said plurality of menu options by a series of selection signals, said means for selecting being accomplished by clicking a button which is readily manipulated by the pilot's same hand which manipulates said cursor control means without discontinuing physical contact with the cursor control means;

wherein said selection signals are a series of unique groups of selection signals, where each group of selection signals comprises a number of clicks of the button, and where the number of clicks of the button corresponding to each group of selection signals is different than the number of clicks of the button corresponding to other groups of selection signals, wherein each group of selection signals is uniquely associated with one of said menu options.

* * * * *